(12) United States Patent
Zhang et al.

(10) Patent No.: US 12,499,660 B2
(45) Date of Patent: Dec. 16, 2025

(54) METHOD AND APPARATUS FOR TRAINING A NEURAL NETWORK, IMAGE RECOGNITION METHOD AND STORAGE MEDIUM

(71) Applicant: Fujitsu Limited, Kawasaki (JP)

(72) Inventors: Meng Zhang, Beijing (CN); Rujie Liu, Beijing (CN)

(73) Assignee: Fujitsu Limited, Kawasaki (JP)

( * ) Notice: Subject to any disclaimer, the term of this patent is extended or adjusted under 35 U.S.C. 154(b) by 572 days.

(21) Appl. No.: 18/047,780

(22) Filed: Oct. 19, 2022

(65) Prior Publication Data

US 2023/0196735 A1 Jun. 22, 2023

(30) Foreign Application Priority Data

Dec. 22, 2021 (CN) .......................... 202111581419.7

(51) Int. Cl.
*G06V 10/774* (2022.01)
*G06V 10/776* (2022.01)
*G06V 10/82* (2022.01)

(52) U.S. Cl.
CPC .......... *G06V 10/774* (2022.01); *G06V 10/776* (2022.01); *G06V 10/82* (2022.01)

(58) Field of Classification Search
CPC ..... G06V 10/774; G06V 10/82; G06V 10/776
See application file for complete search history.

(56) References Cited

U.S. PATENT DOCUMENTS 11,373,274 B1 * 6/2022 Yoon ..................... G06T 3/4053
11,586,925 B2 * 2/2023 Chang ................. G06F 18/2413

FOREIGN PATENT DOCUMENTS

| CN | 107977932 A | 5/2018 |
|----|-------------|--------|
| CN | 109543548 A | 3/2019 |
| CN | 111429436 A | 7/2020 |
| CN | 112052945 A | 12/2020 |
| CN | 113076980 A | 7/2021 |

(Continued)

OTHER PUBLICATIONS

English translation of CN107977932 by Li et al. (Year: 2021).*
(Continued)

*Primary Examiner* — Utpal D Shah
(74) *Attorney, Agent, or Firm* — ArentFox Schiff LLP (57) ABSTRACT

A method and an apparatus for training a neural network, an image recognition method and a computer readable storage medium are disclosed. The neural network includes a first model and a second model. The method for training a neural network includes: acquiring a second image from a first image, wherein a quality of the second image is lower than that of the first image; inputting the first image into the first model of the neural network, and inputting the second image into the second model of the neural network; calculating an attention map and a gradient map of the first model and an attention map and a gradient map of the second model; constructing a loss function based on a matrix of a dot product of the gradient map and the attention map of the first model and a matrix of a dot product of the gradient map and the attention map of the second model; and training the neural network by minimizing the loss function.

18 Claims, 5 Drawing Sheets

(56) References Cited

FOREIGN PATENT DOCUMENTS

CN 113723174 A 11/2021

OTHER PUBLICATIONS

Chen, C., et al., "Progressive Semantic-Aware Style Transformation for Blind Face Restoration", arxiv.org, Cornell University Library, XP081897692, (21 Pages Total), (Mar. 21, 2021).
Zangeneh, E. et al., "Low Resolution Face Recognition Using a Two-Branch Deep Convolutional Neural Network Architecture", arxiv.org, Cornell University Library, XP080771113, (11 Pages Total), (Jun. 20, 2017).
Communication from the European Patent Office in European Application No. 22206074.1, dated May 9, 2023.
Chinese Office Action mailed May 19, 2025, for corresponding Chinese Patent Application No. 202111581419.7, with Machine Translation (CNOA).

* cited by examiner

METHOD AND APPARATUS FOR TRAINING A NEURAL NETWORK, IMAGE RECOGNITION METHOD AND STORAGE MEDIUM

CROSS REFERENCE TO RELATED APPLICATION

This application is based on and claims priority under 35 U.S.C. § 119 to Chinese Patent Application No. 202111581419.7 filed on Dec. 22, 2021, in the China National Intellectual Property Administration and entitled "Method and apparatus for training a neural network and image recognition method" the disclosure of which is incorporated herein by reference in its entirety.

TECHNICAL FIELD

The present disclosure relates to the field of neural network, and in particular to a training of a neural network and image recognition.

BACKGROUND

In recent years, face recognition technology achieves great progress in both the academic aspect and the industry aspect, and is widely applied. In practice, the performance of recognizing a low-quality face image is still limited. This is because that some face features are damaged in case of the low-quality face image, thereby degrading the quality of the face features extracted by a model for face recognition and thus degrading the face recognition performance. The scene in which the low-quality face image is recognized may be a video surveillance scene, a portable terminal, and the like.

SUMMARY

In the following, an overview of the present disclosure is given simply to provide basic understanding to some aspects of the present disclosure. It should be understood that this overview is not an exhaustive overview of the present disclosure. It is not intended to determine a critical part or an important part of the present disclosure, nor to limit the scope of the present disclosure. An object of the overview is only to give some concepts in a simplified manner, which serves as a preface of a more detailed description described later.

According to an aspect of the present disclosure, a method for training a neural network is provided. The neural network includes a first model and a second model. The method includes: acquiring a second image from a first image, wherein a quality of the second image is lower than that of the first image; inputting the first image into the first model of the neural network, and inputting the second image into the second model of the neural network; calculating an attention map and a gradient map of the first model and an attention map and a gradient map of the second model; constructing a loss function based on a matrix of a dot product of the gradient map and the attention map of the first model and a matrix of a dot product of the gradient map and the attention map of the second model; and training the neural network by minimizing the loss function.

In an embodiment, the loss function is constructed as a square of a difference between the matrix of the dot product of the gradient map and the attention map of the first model and the matrix of the dot product of the gradient map and the attention map of the second model.

In an embodiment, the method further includes: after calculating of attention map, softening the attention map of the first model and the attention map of the second model, wherein the loss function is constructed as a square of a difference between a matrix of a dot product of the gradient map and a softened attention map of the first model and a matrix of a dot product of the gradient map and a softened attention map of the second model.

In an embodiment, the first model and the second model are two symmetrical branches of the neural network, and the first model and the second model each include one or more convolutional layers and one or more fully connected layers.

In an embodiment, the method further includes: training the neural network by using the loss function, a knowledge distillation loss function, and a classification loss function.

In an embodiment, the matrix of the dot product of the gradient map and the attention map is a Gram matrix.

In an embodiment, the first image and the second image include a face.

According to another aspect of the present disclosure, an image recognition method is provided. With the method, an image to be recognized is inputted into the second model of the neural network trained by the method for training a neural network according to the present disclosure for recognition.

According to yet another aspect of the present disclosure, an apparatus for training a neural network is provided. The neural network includes a first model and a second model. The apparatus includes: an acquisition means configured to acquire a second image from a first image, wherein a quality of the second image is lower than that of the first image; an input means configured to input the first image into the first model of the neural network, and input the second image into the second model of the neural network; a calculation means configured to calculate an attention map and a gradient map of the first model and an attention map and a gradient map of the second model; and a construction means configured to construct a loss function based on a matrix of a dot product of the gradient map and the attention map of the first model and a matrix of a dot product of the gradient map and the attention map of the second model, wherein the neural network is trained by minimizing the loss function.

Corresponding computer program codes, a computer readable storage medium and a computer program product are provided according to other aspects of the present disclosure.

With a method and an apparatus for training a neural network, the performance of recognizing a low-quality image can be improved.

These and other advantages of the present disclosure will be more apparent by illustrating in detail a preferred embodiment of the present disclosure in conjunction with accompanying drawings below.

BRIEF DESCRIPTION OF THE DRAWINGS

For a further illustration of the above and other advantages and features of the present disclosure, embodiments of the present disclosure are further described in detail hereinafter in conjunction with accompanying drawings. The accompanying drawings, together with the detailed description below, are incorporated into and form a part of the specification. Elements having the same function and structure are denoted by the same reference numerals. It should be noted that the accompanying drawings only illustrate typical embodiments of the present disclosure and should not be construed as a limitation to the scope of the present disclosure. In the drawings.

DETAILED DESCRIPTION OF EMBODIMENTS

Exemplary embodiments of the present disclosure will be described below in conjunction with the accompanying drawings. For the purpose of conciseness and clarity, not all features of an embodiment are described in this specification. However, it should be understood that multiple decisions specific to the embodiment have to be made in a process of developing any such embodiment to realize a particular object of a developer, for example, conforming to those constraints related to a system and a business, and these constraints may change as the embodiments differs. In addition, it should be known that although the developing work may be very complicated and time-consuming, the developing work is only a routine task for those skilled in the art benefitting from the content of the present disclosure.

Here, it should also be noted that in order to avoid obscuring the present disclosure due to unnecessary details, only an apparatus structure and/or processing steps closely related to the solution according to the present disclosure are illustrated in the accompanying drawing, and other details having little relationship to the present disclosure are omitted.

As mentioned above, at present, the performance of recognizing a low-quality images, especially a face image, is low. By analyzing a low-quality recognition model, a high-quality recognition model and features extracted by the low-quality recognition model and the high-quality recognition model, it is found that in the existing deep learning model, an attention map and a gradient map learned from a high-quality image are better than those learned from a low-quality image. In particular, the texture of the gradient map of the high-quality images is more clearly.

Therefore, in order to solve the problems existing in the conventional technology, an effective method for recognizing a low-quality image, especially a face image, based on an attention map and a gradient map are provided according to the present disclosure.

First, a dual-branch neural network model is constructed to extract features of a high-quality image and features of a low-quality image, respectively. Then, a softened attention-based gradient texture-guided learning method is proposed, such that the low-quality model learns information in the attention map and the gradient map of the high-quality model to make them as consistent as possible, thereby improving the performance of recognizing the low-quality image.

Figure 1:
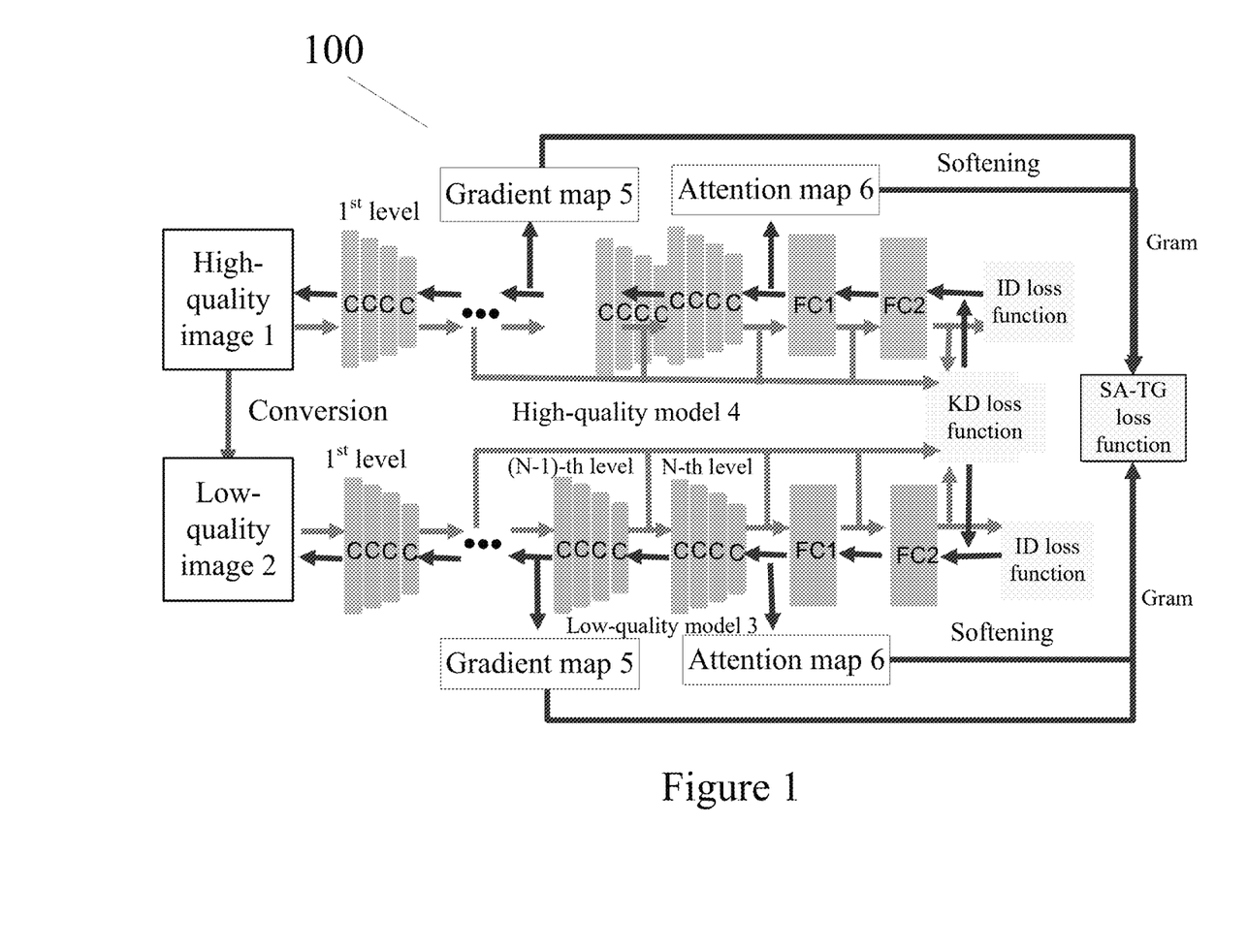
FIG. 1 schematically shows a neural network architecture in which the solution of the present disclosure may be implemented.

FIG. 1 schematically shows a neural network architecture in which the solution of the present disclosure may be implemented. As shown in FIG. 1, a neural network 100 includes two symmetrical branches, that is a low-quality model 3 and a high-quality model 4, wherein each branch includes an N-stage convolutional layer C and two fully connected layers FC1, FC2. A high-quality image 1 is inputted into the high-quality model 4, and a low-quality image 2 converted from the high-quality image 1 is inputted into the low-quality model 3.

A method 200 for training a neural network according to an embodiment of the present disclosure is described below in conjunction with FIG. 1 and FIG. 2 below.

First, in step 201, a second image is acquired from a first image, wherein a quality of the second image is lower than that of the first image. Specifically, in this embodiment, the first image is, for example, the high-quality image 1 in FIG. 1, and the second image is, for example, the low-quality image 2 in FIG. 1.

It should be understood that the quality of the high quality image 1 may be degraded by using any suitable method in the conventional technology, to obtain the low quality image 2, which will not be repeated in the present disclosure.

Next, in step 202, the first image is inputted into a first model of the neural network, and the second image is inputted into a second model of the neural network. Specifically, in this embodiment, the first model is, for example, the high-quality model 4 in FIG. 1, and the second model is, for example, the low-quality model 3 in FIG. 1.

Next, in step 203, an attention map and a gradient map of the first model and an attention map and a gradient map of the second model are calculated. Specifically, in this embodiment, an attention map 6 and the gradient map 5 of the high-quality model 4 and an attention map 6 and the gradient map 5 of the low-quality model 3 are calculated.

It should be understood that the attention map and the gradient map may be calculated by using any suitable method in the conventional technology. For example, the attention map may be calculated in the following manner.

First, an importance of each point of a feature map of the high-quality model 4 and an importance of each point of a feature map of the low-quality model 3 are calculated by using the following formula (1):

$$a_k^c = \frac{1}{z}\sum_i \sum_j \frac{\partial Y^c}{\partial A_{ij}^k} \qquad (1)$$

In formula (1), $a_k^c$ represents an importance of each feature map k to a target class c, $\partial Y^c$ represents a gradient value for the target class c, and $\partial A_{ij}^k$ represents a gradient of each feature map, where i, j, k represent a width, a height and the number of channels of the feature map, respectively.

Second, an attention map of the high-quality model 4 and an attention map of the low-quality model 3 are calculated by using the following formula (2):

$$L_{G-CAM}^c = ReLU\left(\sum_k a_k^c A^k\right) \qquad (2)$$

In formula (2), ReLU represents a linear rectification function, and $A^k$ represents a feature map, where k represents the number of channels. It should be understood that the linear rectification function is an activation function commonly used in artificial neural network.

In an embodiment, in step 203', the attention map of the first model and the attention map of the second model are softened. Specifically, in this embodiment, the attention map of the high-quality model 4 and the attention map of the low-quality model 3 are softened. For example, the attention map may be softened by using the following formula (3):

$$L^c_{SG-CAM} = \frac{\exp(L^c_{G-CAM,i,j}/T)}{\sum_i \sum_j \exp(L^c_{G-CAM,i,j}/T)} \quad (3)$$

In formula (3), T represents a temperature value representing a softening parameter, and a value thereof may be from 0 to positive infinity. In an embodiment, in the present disclosure, the value of T may be from 1 to 10, preferably 5. It should be noted that the above formula (3) is degraded to an original texture-oriented (TG) loss function in a case that the value of T is positive infinity, and the attention map is not softened in a case that the value of T is 1.

It should be understood that the formula for softening the attention map described above is only an example. The attention map may be softened by using any suitable method in the conventional technology.

Next, in step 204, the loss function is constructed based on a matrix of a dot product of the gradient map and the (softened) attention map of the first model and a matrix of a dot product of the gradient map and the (softened) attention map of the second model. Specifically, in this embodiment, the SA-TG loss function is constructed based on a matrix of a dot product of the gradient map and the (softened) attention map of the high-quality model 4.

It should be noted that the loss function may be constructed by using, for example, a Gram matrix, but the present disclosure is not limited thereto, and the loss function may be constructed by using any suitable matrix. For example, the texture-guided (SA-TG) loss function of the soft attention mechanism may be constructed by using the following formula (4):

$$L_{SA-TG} = (G(L^c_{SG-CAM-H} f'_H(x_i)) - G(L^c_{SG-CAM-L} f'_L(x'_i)))^2 \quad (4)$$

In formula (4), $f'_H(x_i)$ represents a gradient map of the high-quality image, $f'_L(x'_i)$ represents a gradient map of the low-quality image, and G( ) represents a Gram matrix.

Finally, in step 205, the neural network is trained by minimizing the loss function. Specifically, in this embodiment, the neural network 100 is trained by minimizing the SA-TG loss function as shown in the above formula (4).

An example of an algorithm for training a neural network using the SA-TG loss function is given below. It should be understood that the method 200 for training a neural network according to an embodiment of the present disclosure is not limited to the following algorithm, but may be implemented using any suitable algorithm.

Input: original training data $D_{train}$, learning rate $f_H(\cdot)$ of a high-quality model and learning rate $f_L(\cdot)$ of a low-quality model: $(\alpha, \beta)$, temperature T.

For Each Training Iteration of the High-Quality Model:

Sample$(x_i, y_i) \sim D_{train}$ $L_{\theta_H,id} \leftarrow -y_i \log f_H(x_i)$ ▷ Calculate a classification loss function of a high-quality model $$\theta_H \leftarrow \theta_H - \alpha \frac{\partial L_{\theta_H,id}}{\partial \theta_H}$$

▷ Update $f_H(\cdot)$ of a high-quality model to minimize the $L_{\theta_H,id}$

For Each Training Iteration of the Low-Quality Model:

Sample$(x_i, y_i) \sim D_{train}$ $x'_i = x_i + \Delta x = \text{transform}(x_i)$ ▷ Acquire a low-quality image from a high-quality image $L_{\theta_H,id} \leftarrow -y_i \log f_H(x_i)$ ▷ Calculate a classification loss function of a high-quality model $$f'_H(x_i) \leftarrow \frac{\partial L_{\theta_H,id}}{\partial x_i}$$

▷ Calculate an input gradient of a high-quality model $G_H = G(f'_H(x_i))$

▷ Calculate a Gram matrix of an input gradient of a high-quality model $$a^c_k = \frac{1}{2} \sum_i \sum_j \frac{\partial Y^c}{\partial A^k_{ij}}$$

▷ Calculate an importance of a feature map k to a target class c of a low-quality model $L^c_{G-CAM} = ReLU\left(\sum_k a^c_k A^k\right)$ ▷ Calculate an attention map of a high quality model $$L^c_{SG-CAM} = \frac{\exp(L^c_{C-CAM,i,j}/T)}{\sum_i \sum_j \exp(L^c_{C-CAM,i,j}/T)}$$

▷ Calculate a softened attention map of a high-quality model $L_{\theta_L,id} \leftarrow -y_i \log f_L(x'_i)$ ▷ Calculate a classification loss function of a low-quality model $$f'_L(x'_i) \leftarrow \frac{\partial L_{\theta_L, id}}{\partial x'_i}$$

▷ Calculate an input gradient of a high quality model $$G_L = G(f'_L(x'_i))$$

▷ Calculate a Gram matrix of an input gradient of a high-quality model $$a_k^c = \frac{1}{2} \sum_i \sum_j \frac{\partial Y^c}{\partial A_{ij}^k}$$

▷ Calculate an importance of a feature map k to a target class c of a low-quality model $$L_{G-CAM}^c = ReLU\left(\sum_k a_k^c A^k\right)$$

▷ Calculate an attention map of a low-quality model $$L_{SG-CAM}^c = \frac{\exp(L_{C-CAM,i,j}^c/T)}{\sum_i \sum_j \exp(L_{G-CAM,i,j}^c/T)}$$

▷ Calculate a softened attention map of a low-quality model $$L_{SA-TG} = (G(L_{SG-CAN-H}^c f'_H(x_i)) - G(L_{SC-CAM-L}^c f'_L(x'_i)))^2$$

▷ Calculate a SA-TG loss function $$\theta_L \leftarrow \theta_L - \beta\left(\frac{\partial L_{\theta_L, id}}{\partial \theta_L} + \frac{\partial L_{TG}}{\partial \theta_L}\right)$$

▷ Update $f_L(\cdot)$ of a low-quality model to minimize $L_{\theta_L, id}$ and $L_{TG}$ In a preferable embodiment, as shown in FIG. 1, the neural network 100 may also be trained by using, for example, an identification (ID) loss function and a knowledge distillation (KD) loss function. It is known in the conventional technology to train the neural network by using the ID loss function and the KD loss function, which will not be repeated in the present disclosure.

Figure 3:
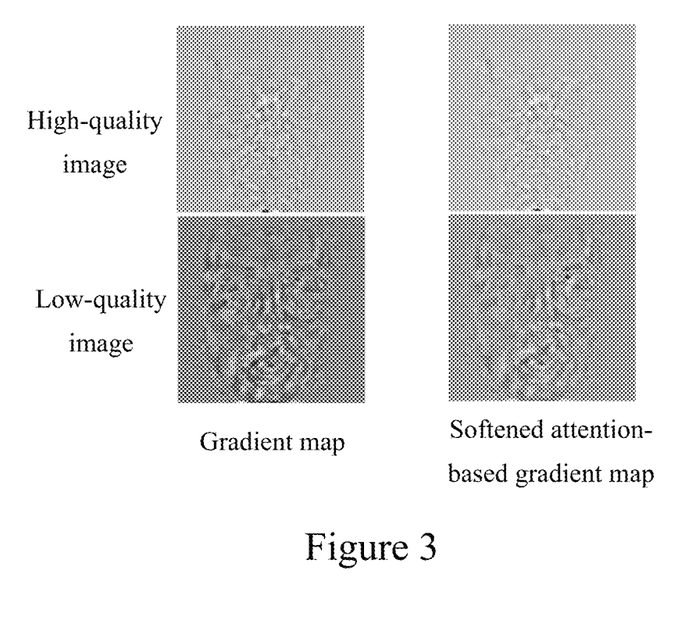
FIG. 3 schematically shows a comparison between texture information of an attention map and a gradient map of a high-quality image and texture information of an attention map and a gradient map of a low-quality image.

FIG. 3 shows a softened attention-based gradient map of a low-quality image and a softened attention-based gradient map of a high-quality image. As can be seen from FIG. 3, there is obvious difference between texture information of an attention map and a gradient map of a high-quality and texture information of an attention map and a gradient map of a low-quality image. This difference may be compensated by the method 200 for training a neural network described above, that is, may be compensated by using the SA-TG loss function to enable the low-quality model to learn the information of the high quality model, especially the texture information.

The beneficial effects of the method for training a neural network according the present disclosure may be embodied in Table 1 below. In the experiments in Table 1, ResNet34 is used as the neural network model, the WebFace training set is used for training, and the IVS credential face recognition test set is used for testing. To simulate low-quality face recognition, for the training set, JPEG compression is randomly increased in WebFace to simulate the low-quality image. For the test set, there are two cases, one case is that an image of ID photo is compressed with JPEG and the scene photo is not compressed, and the other case is that both the ID photo and the scene photo are compressed.

TABLE 1

| Model | IVS(TPR@FAR = 10^-5) | |
|---|---|---|
| | JPEG2Ori | JPEG2JPEG |
| Traditional model | 50.32 | 24.77 |
| Traditional model + KD loss function | 54.43 | 28.37 |
| Traditional model + SA-TG loss function | 56.14 | 29.41 |

As can be seen from Table 1, compared with the mainstream KD loss function, with the SA-TG loss function according to the present disclosure, the performance of recognizing a low-quality face can be significantly improved.

The method for training a neural network according to an embodiment of the present disclosure is described in detail above with reference to FIG. 1 and FIG. 3. It can be seen form the above description that the performance of recognizing a low-quality image, especially a face image, is improved through the method according to the embodiments.

The methods discussed above may be implemented completely by computer executable programs, or may be partially or completely implemented by hardware and/or firmware. When the methods are implemented by hardware and/or firmware or the computer executable programs are loaded to a hardware device in which programs can be executed, a device for processing a transaction to be described is implemented. Hereinafter, the summary of the device is given without repeating some details discussed above. However, it should be noted that, although the device can execute the aforementioned method, the method may not include parts of the described device or are not always executed by the parts of the described device.

Figure 4:
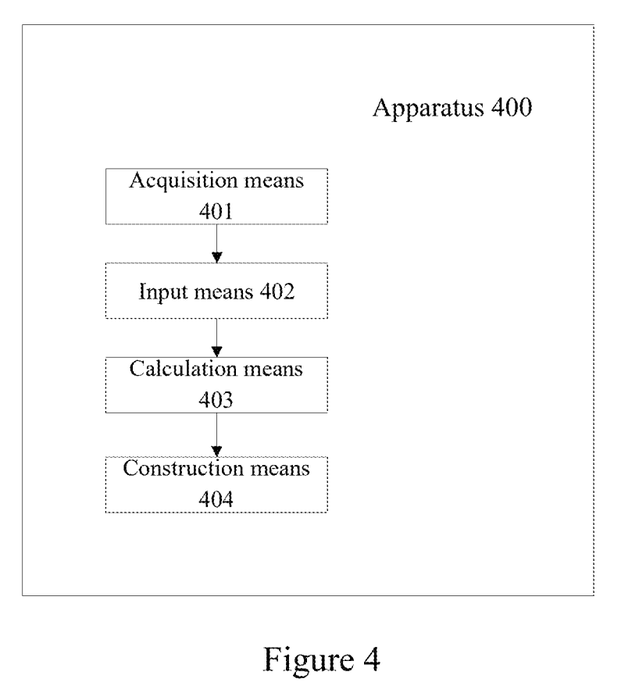
FIG. 4 is a block diagram showing an apparatus for training a neural network according to an embodiment of the present disclosure.

FIG. 4 shows an apparatus 400 for training a neural network according to an embodiment. The apparatus 400 includes an acquisition means 401, an input means 402, a calculation means 403 and a construction means 404. The acquisition means 401 is configured to acquire a second image from a first image, wherein a quality of the second image is lower than that of the first image. The input means 402 is configured to input the first image into the first model of the neural network, and input the second image into the second model of the neural network. The calculation means 403 is configured to calculate an attention map and a gradient map of the first model and an attention map and a gradient map of the second model. The construction means 404 is configured to construct a loss function based on a matrix of a dot product of the gradient map and the attention map of the first model and a matrix of a dot product of the gradient map and the attention map of the second model, wherein the neural network is trained by minimizing the loss function.

In an embodiment, the loss function is constructed as a square of a difference between the matrix of the dot product of the gradient map and the attention map of the first model and the matrix of the dot product of the gradient map and the attention map of the second model.

In an embodiment, the apparatus 400 further includes a softening means configured to soften the attention map of the first model and the attention map of the second model after calculating of attention map, wherein the loss function is constructed as a square of a difference between a matrix of a dot product of the gradient map and a softened attention map of the first model and a matrix of a dot product of the gradient map and a softened attention map of the second model.

In an embodiment, the first model and the second model are two symmetrical branches of the neural network, and the first model and the second model each include one or more convolutional layers and one or more fully connected layers.

Figure 2:
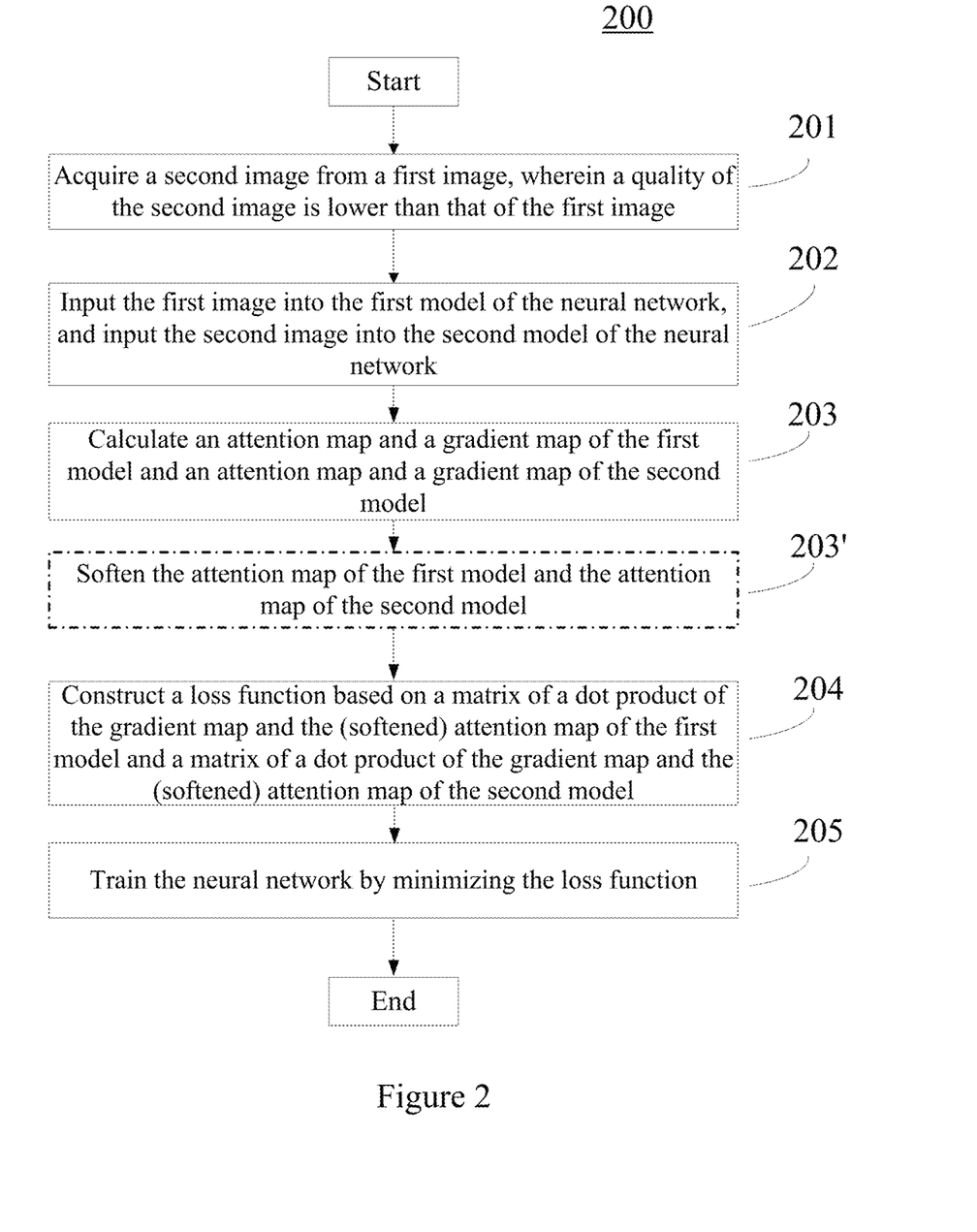
FIG. 2 shows a flowchart of a method for training a neural network according to an embodiment of the present disclosure.

The apparatus 400 for training a neural network shown in FIG. 4 corresponds to the method 200 for training a neural network shown in FIG. 2. Therefore, the relevant details about each means in the apparatus 400 for training a neural network have been given in detail in the description of the method 200 for training a neural network in FIG. 2, which is not repeated here.

Modules and units of the above means may be configured by software, firmware, hardware or a combination thereof. Specific means or methods for configuring are well known to those skilled in the art, and are not described in detail herein. In the case wherein the present disclosure is realized with software or firmware, a program constituting the software is installed in a computer with a dedicated hardware structure (e.g. the general computer 500 shown in FIG. 5) from a storage medium or network, wherein the computer is capable of implementing various functions when installed with various programs.

An image recognition method is further provided according to the present disclosure. The method includes inputting an image to be recognized into the low-quality model of the neural network trained by the method for training a neural network according to an embodiment of the present disclosure for recognizing the image.

Figure 5:
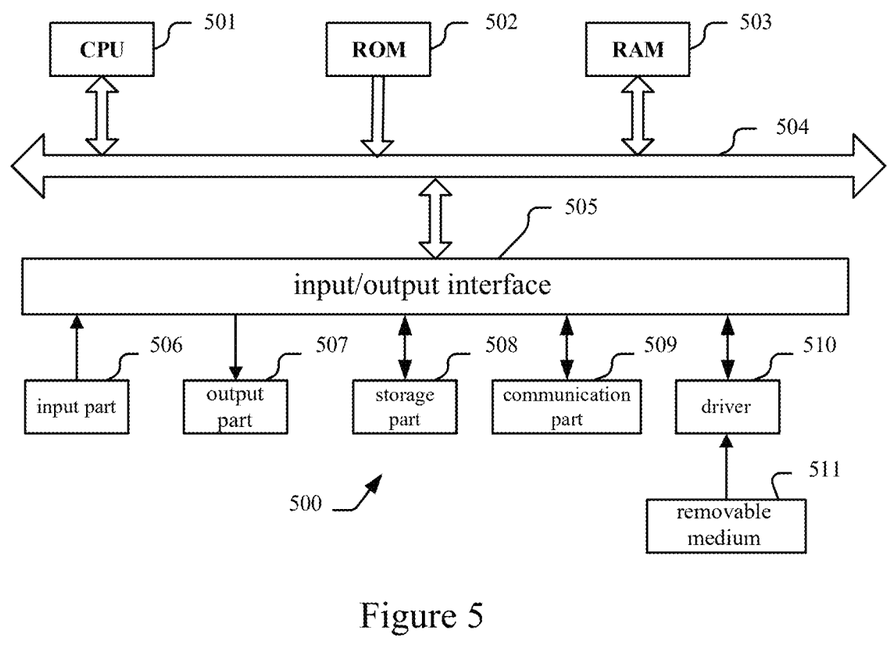
FIG. 5 is a block diagram of an exemplary structure of a general-purpose personal computer in which a method and/or apparatus according to an embodiment of the present disclosure may be implemented.

FIG. 5 is a block diagram of an exemplary structure of a general-purpose personal computer in which a method and/or apparatus according to an embodiment of the present disclosure may be implemented. As shown in FIG. 5, a central processing unit (CPU) 501 executes various processing according to a program stored in a read-only memory (ROM) 502 or a program loaded to a random access memory (RAM) 503 from a storage section 508. The data needed for performing the various processing by the CPU 501 may be stored in the RAM 503 as needed. The CPU 501, the ROM 502 and the RAM 503 are connected with each other via a bus 504. An input/output interface 505 is also connected to the bus 504.

The following components are connected to the input/output interface 505: an input section 506 (including a keyboard, a mouse and the like), an output section 507 (including a display such as a cathode ray tube (CRT), a liquid crystal display (LCD), a loudspeaker and the like), a storage section 508 (including a hard disc and the like), and a communication section 509 (including a network interface card such as a LAN card, a modem and the like). The communication section 509 performs communication processing via a network such as the Internet. A driver 510 may also be connected to the input/output interface 505 as required. The removable medium 511, such as a magnetic disk, an optical disk, a magnetic optical disk and a semiconductor memory and the like, may be mounted to the driver 510 as required, such that the computer program read therefrom is mounted to the storage section 508 as required.

In the case where the foregoing series of processing is achieved through software, programs constituting the software are installed from a network such as the Internet or a memory medium such as the removable medium 511.

It should be appreciated by those skilled in the art that the memory medium is not limited to the removable medium 511 shown in FIG. 5, which has program stored therein and is distributed separately from the apparatus so as to provide the programs to users. The removable medium 511 may be, for example, a magnetic disc (including a floppy disc (registered trademark)), a compact disc (including a compact disc read-only memory (CD-ROM) and a digital versatile disc (DVD), a magneto optical disc (including a mini disc (MD) (registered trademark)), and a semiconductor memory. Alternatively, the storage medium may be the ROM 502, the hard disk contained in the storage section 508 and the like, which has a program stored therein and is distributed to the user along with an apparatus in which they are incorporated.

Computer program codes and a computer program product storing machine-readable instruction codes are further provided according to the present disclosure. The instruction codes, when read and executed by a machine, perform the method according to the embodiment of the present disclosure described above.

Accordingly, a storage medium configured to carry the program product in which machine-readable instruction codes are stored is also included in the present disclosure. The memory medium includes but is not limited to a soft disc, an optical disc, a magnetic optical disc, a memory card, a memory stick and the like.

According to an aspect of the present invention, there is provided a method for training a neural network including a first model and a second model, the method including: acquiring a second image from a first image, wherein a quality of the second image is lower than that of the first image; inputting the first image into the first model of the neural network, and inputting the second image into the second model of the neural network; calculating an attention map and a gradient map of the first model and an attention map and a gradient map of the second model; constructing a loss function based on a matrix of a dot product of the gradient map and the attention map of the first model and a matrix of a dot product of the gradient map and the attention map of the second model; and training the neural network by minimizing the loss function. The loss function is constructed as a square of a difference between the matrix of the dot product of the gradient map and the attention map of the first model and the matrix of the dot product of the gradient map and the attention map of the second model. The method further includes, after calculating of attention map, softening the attention map of the first model and the attention map of the second model. The loss function is constructed as a square of a difference between a matrix of a dot product of the gradient map and a softened attention map of the first model and a matrix of a dot product of the gradient map and a softened attention map of the second model. The first model and the second model are two symmetrical branches of the neural network. The first model and the second model each include one or more convolution layers and one or more fully connected layers. The matrix is a Gram matrix. The method further includes training the neural network by using the loss function, a knowledge distillation loss function, and a classification loss function. The first image and the second image include a face.

According to another aspect of the present invention, there is provided an image recognition method, including inputting an image to be recognized into the second model of the neural network trained by the method for training a neural network according to the present disclosure for recognition.

According to yet another aspect of the present invention, there is provided an apparatus for training a neural network including a first model and a second model, including: an acquisition means configured to acquire a second image from a first image, wherein a quality of the second image is lower than that of the first image; an input means configured to input the first image into the first model of the neural network, and input the second image into the second model of the neural network; a calculation means configured to calculate an attention map and a gradient map of the first model and an attention map and a gradient map of the second model; and a construction means configured to construct a loss function based on a matrix of a dot product of the gradient map and the attention map of the first model and a matrix of a dot product of the gradient map and the attention map of the second model, wherein the neural network is trained by minimizing the loss function. The loss function is constructed as a square of a difference between the matrix of the dot product of the gradient map and the attention map of the first model and the matrix of the dot product of the gradient map and the attention map of the second model. The apparatus further includes a softening means configured to soften, after calculating of attention map, the attention map of the first model and the attention map of the second model. The loss function is constructed as a square of a difference between a matrix of a dot product of the gradient map and a softened attention map of the first model and a matrix of a dot product of the gradient map and a softened attention map of the second model. The first model and the second model are two symmetrical branches of the neural network. The first model and the second model each include one or more convolution layers and one or more fully connected layers. The matrix is a Gram matrix. The neural network is trained by using the loss function, a knowledge distillation loss function, and a classification loss function. The first image and the second image include a face.

According to still yet another aspect of the present invention, there is provided a computer readable storage medium storing a program which can be executed by a processor to perform the following operations: acquiring a second image from a first image, wherein a quality of the second image is lower than that of the first image; inputting the first image into the first model of the neural network, and inputting the second image into the second model of the neural network; calculating an attention map and a gradient map of the first model and an attention map and a gradient map of the second model; constructing a loss function based on a matrix of a dot product of the gradient map and the attention map of the first model and a matrix of a dot product of the gradient map and the attention map of the second model; and training the neural network by minimizing the loss function.

Finally, to be further noted, the term "include", "comprise" or any variant thereof is intended to encompass nonexclusive inclusion such that a process, method, article or apparatus including a series of elements includes not only those elements but also other elements which have been not listed definitely or an element(s) inherent to the process, method, article or device. Unless expressively limited otherwise, an element defined by an statement of "comprising (including) one . . . " does not exclude a case that other similar elements exist in the process, method, article or device.

Although the embodiments of the present disclosure have been described above in detail in connection with the drawings, it should be appreciated that the embodiments as described above are merely illustrative but not limitative of the present disclosure. Those skilled in the art can make various modifications and variations to the above embodiments without departing from the spirit and scope of the present disclosure. Therefore, the scope of the present disclosure is defined merely by the appended claims and their equivalents.

The invention claimed is:

1. A method for training a neural network comprising a first model and a second model, the method comprising:
   acquiring a second image from a first image, wherein a quality of the second image is lower than that of the first image;
   inputting the first image into the first model of the neural network, and inputting the second image into the second model of the neural network;
   calculating an attention map and a gradient map of the first model and an attention map and a gradient map of the second model;
   constructing a loss function based on a square of a difference between a matrix of a dot product of the gradient map and the attention map of the first model and a matrix of a dot product of the gradient map and the attention map of the second model; and
   training the neural network by minimizing the loss function.

2. The method according to claim 1, further comprising: after calculating of attention map, softening the attention map of the first model and the attention map of the second model.

3. The method according to claim 2, wherein the loss function is constructed as a square of a difference between a matrix of a dot product of the gradient map and a softened attention map of the first model and a matrix of a dot product of the gradient map and a softened attention map of the second model.

4. The method according to claim 1, wherein the first model and the second model are two symmetrical branches of the neural network.

5. The method according to claim 4, wherein the first model and the second model each comprise one or more convolutional layers and one or more fully connected layers.

6. The method according to claim 1, wherein the matrix is a Gram matrix.

7. The method according to claim 1, further comprising: training the neural network by using the loss function, a knowledge distillation loss function, and a classification loss function.

8. The method according to claim 1, wherein the first image and the second image include a face.

9. An image recognition method, comprising:
   inputting an image to be recognized into the second model of the neural network trained by the method according to claim 1 for recognition.

10. An apparatus for training a neural network comprising a first model and a second model, comprising:

an acquisition means configured to acquire a second image from a first image, wherein a quality of the second image is lower than that of the first image;

an input means configured to input the first image into the first model of the neural network, and input the second image into the second model of the neural network;

a calculation means configured to calculate an attention map and a gradient map of the first model and an attention map and a gradient map of the second model; and a construction means configured to construct a loss function based on a square of a difference between a matrix of a dot product of the gradient map and the attention map of the first model and a matrix of a dot product of the gradient map and the attention map of the second model, wherein the neural network is trained by minimizing the loss function.

11. The apparatus according to claim 10, further including: a softening means configured to soften, after calculating of attention map, the attention map of the first model and the attention map of the second model.

12. The apparatus according to claim 11, wherein the loss function is constructed as a square of a difference between a matrix of a dot product of the gradient map and a softened attention map of the first model and a matrix of a dot product of the gradient map and a softened attention map of the second model.

13. The apparatus according to claim 10, wherein the first model and the second model are two symmetrical branches of the neural network.

14. The apparatus according to claim 13, wherein the first model and the second model each include one or more convolution layers and one or more fully connected layers.

15. The apparatus according to claim 10, wherein the matrix is a Gram matrix.

16. The apparatus according to claim 10, wherein the neural network is trained by using the loss function, a knowledge distillation loss function, and a classification loss function.

17. The apparatus according to claim 10, wherein the first image and the second image include a face.

18. A non-transitory computer readable medium storing a program which can be executed by a processor to perform the method according to claim 1.

* * * * *